United States Patent
Kelly et al.

(10) Patent No.: US 9,896,922 B2
(45) Date of Patent: Feb. 20, 2018

(54) SYSTEM AND APPARATUS FOR CREATING A LIQUID CARBON DIOXIDE FRACTURING FLUID

(71) Applicants: Richard M. Kelly, East Amherst, NY (US); Nick Joseph Degenstein, East Amherst, NY (US); Bernard Thomas Neu, Lancaster, NY (US)

(72) Inventors: Richard M. Kelly, East Amherst, NY (US); Nick Joseph Degenstein, East Amherst, NY (US); Bernard Thomas Neu, Lancaster, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 13/724,907

(22) Filed: Dec. 21, 2012

(65) Prior Publication Data

US 2014/0174747 A1 Jun. 26, 2014

(51) Int. Cl.
*C09K 8/62* (2006.01)
*E21B 43/267* (2006.01)
*E21B 43/16* (2006.01)

(52) U.S. Cl.
CPC .............. *E21B 43/267* (2013.01); *C09K 8/62* (2013.01); *E21B 43/164* (2013.01); *Y02P 90/70* (2015.11)

(58) Field of Classification Search
CPC ............................. E21B 43/267; E21B 21/062
USPC ..................................................... 166/75.15
See application file for complete search history.

(56) References Cited

U.S. PATENT DOCUMENTS

| | | | | |
|---|---|---|---|---|
| 3,368,627 A | * | 2/1968 | Hurst et al. | 166/307 |
| 4,374,545 A | | 2/1983 | Bullen et al. | |
| 4,407,825 A | | 10/1983 | Hiestand et al. | |
| RE32,302 E | * | 12/1986 | Almond | C09K 8/703 |
| | | | | 166/308.6 |
| 4,825,952 A | * | 5/1989 | Mzik | C09K 8/64 |
| | | | | 166/308.4 |
| 5,069,283 A | * | 12/1991 | Mack | 166/308.6 |
| 5,558,160 A | * | 9/1996 | Tudor | 166/280.2 |
| 7,735,551 B2 | | 6/2010 | Vozniak et al. | |
| 2006/0289166 A1 | * | 12/2006 | Stromquist et al. | 166/305.1 |
| 2008/0142224 A1 | | 6/2008 | Wilson | |
| 2010/0051272 A1 | * | 3/2010 | Loree et al. | 166/279 |

(Continued)

FOREIGN PATENT DOCUMENTS

EP 0695852 A2 2/1996
EP 0711902 A2 5/1996

*Primary Examiner* — Angela M DiTrani
*Assistant Examiner* — Avi Skaist
(74) *Attorney, Agent, or Firm* — Iurie A. Schwartz (57) ABSTRACT

A method, system, and apparatus required for creating a mixture of dry proppant and liquid carbon dioxide ($LCO_2$) for fracturing oil and gas formations is presented. The operation includes making a mixture of dry proppant and liquid carbon dioxide ($LCO_2$) for use in a fracturing operation by supplying dry proppant that is pressurized to between 75 and 600 psia with a gas; further supplying a stream of sub-cooled $LCO_2$ having a pressure substantially equal to that of the pressurized dry proppant; and adding dry, pressurized proppant to the stream of sub-cooled $LCO_2$, thereby forming a mixed $LCO_2$ and proppant fracturing slurry.

7 Claims, 5 Drawing Sheets

(56) References Cited

U.S. PATENT DOCUMENTS

2010/0243252 A1* 9/2010 Luharuka et al. ............ 166/283
2014/0151049 A1* 6/2014 Sanborn et al. ........... 166/305.1

* cited by examiner

SYSTEM AND APPARATUS FOR CREATING A LIQUID CARBON DIOXIDE FRACTURING FLUID

FIELD OF INVENTION

The present disclosure comprises a system and apparatus for forming a proppant and carbon dioxide fracturing fluid that can be delivered in a semi-continuous or continuous manner for the fracture treatment of oil and gas reservoirs.

BACKGROUND OF THE INVENTION

The use of carbon dioxide for enhanced production of oil and gas from reservoirs is well known. Usage of liquid carbon dioxide (LCO2) in fracture treatment of oil and gas formations has certain advantages in water sensitive and low pressure formations including a significant reduction of water volume and promotion of water flowback, (retrieval of water/fluid used in fracture treatment) which minimizes formation damage caused by water. LCO2 used in fracturing treatments is typically added to a high pressure stream of water and proppant (typically sand) at the well-head. Combining water with proppant and adding a separate pressurized LCO2 stream is the most conventional method of forming a CO2-energized fracture fluid. This is due, in large part, because it is simpler to mix proppant with water at atmospheric pressure, than it is to add proppant to liquid carbon dioxide at a pressure above the triple point of carbon dioxide, (i.e., greater than 75.1 psia).

Equipment is available and can be used for small fracture treatments to deliver about 100 percent LCO2 and essentially dry proppant. In this case, "small" fracture treatments are considered to be those up to about 20 tons of proppant on a per batch basis. This equipment is designed for the delivery of a dry proppant and LCO2 combination and typically delivers the mixture from a relatively small pressurized batch tank. Additional quantities of LCO2 are added to dilute the proppant concentration of the fracturing slurry stored in the tank to the appropriate level required for fracture treatment. Once the small batch of LCO2 and proppant is exhausted, the fracture treatment must either be completed or stopped because it is not possible to quickly empty and refill these existing relatively "small" batch vessels.

Therefore, a need has been established to develop a portable LCO2 and proppant blender system that possesses higher proppant capacity for much larger fracture treatments. One example includes the need for supplying this type of proppant for fracturing long-reach, multi-stage, horizontally drilled formations. Because millions of pounds of proppant may be required for large fracture treatments, a single blender, or multiple blenders must be capable of delivering proppant and LCO2 in a continuous or semi-continuous manner. There also exists a continuing need for and efficient, portable LCO2 and proppant blender that can be used for small fracture treatments.

Earlier efforts, for example, as described in U.S. Pat. No. 4,374,545, provides for a simple batch process where proppant is cooled to LCO2 temperatures by direct contact with LCO2 yielding a batch tank of proppant and LCO2 fracturing slurry. As the proppant slurry is delivered from this batch tank, LCO2 is added to maintain a relatively high LCO2 level in the tank. Using this slurry batch approach to achieve a much larger continuous or semi-continuous injection method is problematic, both because of the long delay and wasted carbon dioxide when the slurry vessel must be "blown down" (i.e., depressurized) to add more proppant. Other systems utilizing LPG (liquefied petroleum gas—such as described in U.S. Pat. Nos. 4,407,825 and 7,735,551) blend dry proppant with flowing LPG at close to ambient temperature. LPG is higher boiling and it is not necessary to precool the proppant and there is no possibility of vaporizing the LPG fluid as dry proppant is added to it.

In order to achieve the established need for a semi-continuous or continuous fracturing operation using a mixture of LCO2 and dry proppant, the system requires sub-cooling LCO2 (using booster pumping and/or using a subcooling heat exchanger(s) and/or pressurizing the headspace in the supply LCO2 tanks). The subcooling must be managed in such a way so that warm dry proppant can be added to the flowing LCO2 stream without vaporizing a portion of the LCO2 and so that the slurry fracture fluid is available with the appropriate level of net positive suction head (NPSH) required for safe and reliable operation of the high pressure frac pumps. A method for metering dry proppant is also required which is provided by the use of an auger, control valve, eductor, or some other appropriate method of metering proppant. The present invention described below addresses the design of the system, and associated equipment that meets this need.

SUMMARY OF THE INVENTION

The present invention describes a system, and apparatus for mixing LCO2 and dry proppant to provide a fracturing slurry in an uninterrupted continuous, semi-continuous process, for fracturing treatment of oil and gas formations. More specifically, the use of a novel design including the following steps is provided: a system for loading dry proppant into at least one dry proppant storage vessel with one or more conveying means; pressurizing the proppant storage vessel(s) to between 75 and 600 psia with a gas, thereby pressurizing the proppant storage vessel(s) and ensuring the proppant remains dry; supplying a stream of sub-cooled LCO2 having a pressure less than or equal to the pressurized proppant storage vessel(s); and adding dry proppant from the pressurized proppant storage vessel(s) to the stream of sub-cooled LCO2, thereby forming a mixed LCO2 and proppant fracturing fluid.

The system uses LCO2 obtained from at least one LCO2 storage tank. In addition, there is also provided a control system for controlling the flow of dry proppant from pressurized proppant storage vessel(s) by allowing the flow of the dry proppant through a metering device into the sub-cooled LCO2 stream; and mixing or blending the dry proppant with the sub-cooled LCO2 stream to a desired level of proppant loading within the sub-cooled LCO2. The loading is typically in the range of 0.1 to 10 lbs of dry proppant to each gallon of sub-cooled LCO2. This mixing or blending is used to form the fracturing fluid, and is preferably preformed on a continuous (uninterrupted) basis during the fracturing operation for well injection.

BRIEF DESCRIPTION OF THE DRAWINGS

The above and other aspects, features, and advantages of the present invention will be more apparent from the following drawings, wherein.

DETAILED DESCRIPTION OF THE INVENTION

The present invention involves a system and apparatus for providing a continuous or semi-continuous supply of fracturing fluid, where the flow and method of controlling the flow uses a metering device (such as an auger) to add proppant into a LCO2 stream. The proppant is warm and dry, in that is desired to use ambient temperature proppant that contains no free water. Ambient temperatures may vary from approximately 0 to 100 degrees Fahrenheit, depending on the geographic location and time of year, and the temperature range may be even more extreme depending on the location of the drilling rig. "Warm" is used herein as a relative term, where the proppant is warm compared to the liquid carbon dioxide to which it will be added. In alternative embodiments, the proppant may be pre-cooled to some extent, such that its temperature is less than ambient temperature. It is desired that the proppant is dry and substantially devoid of liquid in order to maintain free flowing characteristics when conveyed through the system. For the present invention, the use of an auger that is capable of metering dry proppant to a mixing point for addition to LCO2 wherein the loading of the dry proppant per gallon of LCO2 is in the range of at least 0.1 to 10 lbs per gallon is desired. An even more preferable range is 0.1 to 4 lbs/gallon. Generally it is preferred that the pressurized proppant is added to the liquid carbon dioxide at substantially the same pressure. If an auger is used, the LCO2 stream should preferably be about 0 to 2 psi less than the upstream proppant pressure to prevent the LCO2 from passing into the proppant vessel. If, however, an eductor is employed, the LCO2 stream should be preferably about 5 to 10 psi greater than the upstream proppant pressure, because an eductor will operate by pulling in the proppant against an existing pressure gradient.

The dry proppant loading in the LCO2 and the flow rate of the combined stream are normally measured by use of a nuclear densitometer, a magnetic flow meter, a coriolis meter or other suitable measurement devices. The addition of the metered dry proppant with a sub-cooled LCO2 stream provides the desired proppant loading for the fracturing operation and this mixture is referred herein as the "fracturing fluid". Any gaseous carbon dioxide entrained within the proppant is normally recondensed in the sub-cooled LCO2. Using the aforementioned mixing technique, carbon dioxide vapor is only formed in the sub-cooling heat exchanger and not when the dry warm proppant mixes with the cold LCO2. In addition, no LCO2 remains in the proppant vessel when the proppant vessel is "blown down" to atmospheric pressure where it is to be recharged with proppant. The present invention also includes directing the flow of primarily liquid fracturing fluid from the metering/mixing or blending device through the appropriate piping and manifolding such that it reaches the high pressure frac pumps in the desired liquid state. A combination of the sub-cooling methods can be used depending on feed LCO2 conditions to ensure an appropriate level of NPSH (Net Pressure Suction Head) at the high pressure fracturing pumps. It is also part of the present invention to supply and maintain the LCO2 fracturing fluid to the high pressure fracturing pumps to approximately 50 psi NPSH or at least a pressure sufficiently above saturation conditions for normal, safe, and reliable operation of these high pressure pumps. Feeding of vapor or provision of a low NPSH, risks vapor lock or cavitation effects which negatively affect performance and can damage the pumps.

LCO2 can be supplied from the storage tanks at a variety of pressures, and the pressure of the LCO2 supply tanks will normally change substantially over the course of the fracturing operation, for example by up to 100 psi or more. Since the pressure of the LCO2 is constantly changing, the pressure of the proppant vessel needs to be accurately controlled in real time.

Different methods of providing and controlling pressure above the saturation point for carbon dioxide are preferable dependent on the different LCO2 supply conditions. For example, it has been determined that the booster pump approach is very effective when starting with a relatively low pressure LCO2 supply. High LCO2 supply pressures typically cannot be boosted due to equipment design pressure limitations. Sub-cooling the LCO2 in a heat exchanger is very effective when high pressure LCO2 is available and the LCO2 is close to the saturation conditions. For many moderate LCO2 supply pressures, both a booster pump and a sub-cooling heat exchanger are often necessary to achieve high proppant loadings while supplying the proppant slurry mix to the high pressure frac pumpers with sufficient NPSH or pressure above the saturation pressure. Another approach for controlling the LCO2 supply pressure is to pressurize the LCO2 tanks with vapor in the tank head space. This approach is similar to pumping, but instead requires supplying pressurized vapor to the head space of each tank.

Figure 1:
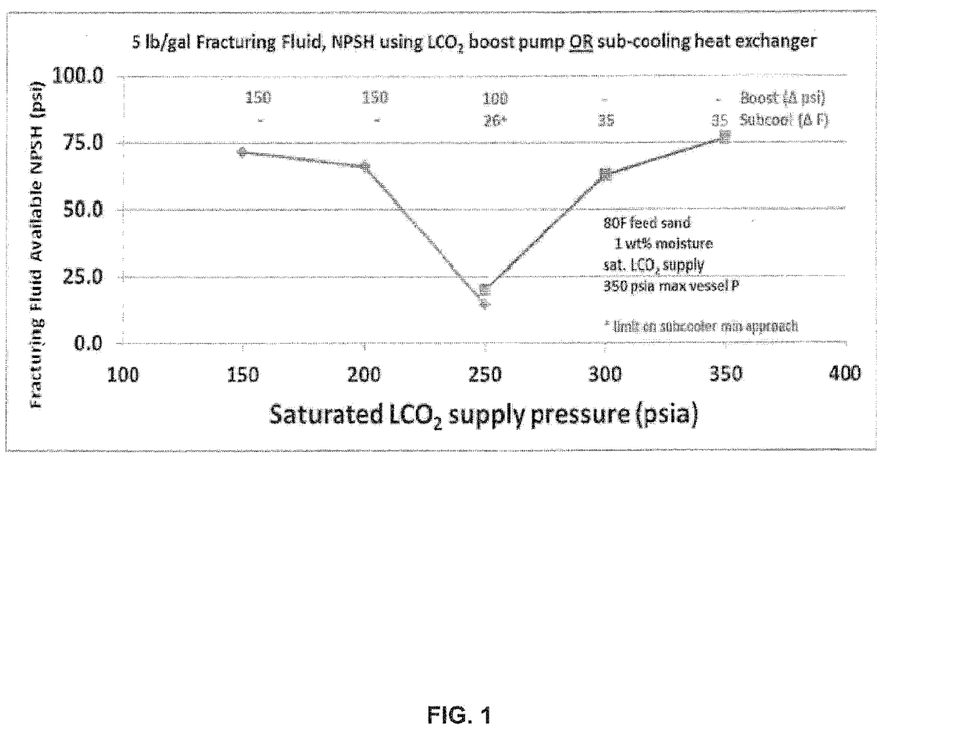
FIG. 1 illustrates the effect of using a booster pump or sub-cooling a 5 lb/gallon proppant/liquid carbon dioxide fracturing fluid on required NPSH (Net Pressure Suction Head) for optimizing saturated liquid carbon dioxide well injection.

FIG. 1 illustrates the NPSH effect of the booster pump approach at low LCO2 supply pressures and the effect of the sub-cooling heat exchanger on higher pressure feed LCO2. In both cases the feed LCO2 is in the saturated condition. With low pressure LCO2 supply (e.g., less than 250 psia), it is possible to use a booster pump to raise the pressure of the saturated LCO2 by at least 100 psi, if the blender vessel is rated for 350 psi (a typical value). If the LCO2 is supplied at 350 psia, as would normally be the case at the beginning of a summer season fracturing operation, a booster pump would not be sufficient to generate the required NPSH for a blender vessel rated at 350 psi. In this scenario, high pressure feed LCO2 utilizes a sub-cooling heat exchanger to lower the temperature of the feed LCO2 from about 10 degrees Fahrenheit to about −20 degrees Fahrenheit. The cooling action of the sub-cooling heat exchanger concurrently generates NPSH in the LCO2 stream. The data points in Plot A demonstrate that with a LCO2 supply pressure of 250 psi neither booster pumping or the subcooling heat exchanger alone are sufficient for generating the required NPSH.

LCO2 sub-cooling can be achieved by passing a portion of the LCO2 through a pressure reducing valve such that a portion of the LCO2 stream evaporates or 'flashes' forming a lower temperature as well as lower pressure LCO2 stream.

This lower pressure CO2 stream is typically pressurized to about 125 psia, and is used in the sub-cooling heat exchanger to reduce the temperature of the main, higher pressure LCO2 stream. As the higher pressure LCO2 stream is cooled in this sub-cooling heat exchanger the lower pressure CO2 stream evaporates and the vaporized and/or warmed portion of the low pressure stream is vented, as needed, to maintain the pressure of the low pressure stream at, for example, near 125 psia.

Figure 2:
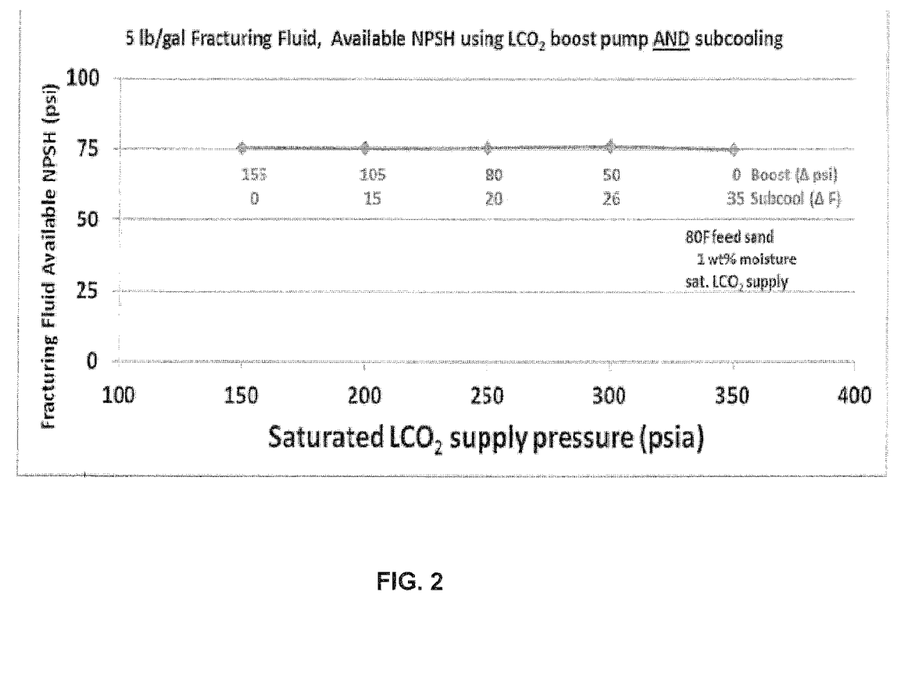
FIG. 2 illustrates the effect of using the combination of a booster pump and sub-cooling for a 5 lb/gallon proppant/liquid carbon dioxide fracturing fluid on required NPSH (Net Positive Suction Head) for optimizing saturated liquid carbon dioxide well injection.

If the booster pump and sub-cooling processes are used in combination, then it is possible to generate an appropriate pressure above the saturation pressure such that the fracturing fluid can be supplied directly to the high pressure frac pumps at constant NPSH values. FIG. 2 shows that it is possible to use this combination approach to achieve 75 psi (NPSH) above the saturation pressure, resulting in a fracturing fluid that is sufficiently sub-cooled and either semi-continuously or continuously delivered in an uninterrupted manner to the high pressure frac pump.

As mentioned above, at relatively low LCO2 supply pressures (e.g., less than about 250 psia), a high booster pump pressure rise and relatively low amount of sub-cooling are needed. In contrast, at high LCO2 supply pressures (e.g. above 250 psia), a lower booster pump pressure rise and a high amount of sub-cooling are needed. At a saturated LCO2 supply pressure of about 250 psia, substantial amounts of both boost pumping and sub-cooling via a heat exchanger are required.

Table 1 below provides the data obtained for the use of the combination of the booster pump and sub-cooling obtained with a heat exchanger to enhance the use of the carbon dioxide fracturing fluid performance. Details for the case of using a 5 lb proppant per gallon flow rate of LCO2 are presented.

In addition to the booster pump and sub-cooling heat exchanger combination, described in FIG. 1, FIG. 2, and Table 1, another possible method to manage the LCO2 supply sub-cooling system is to supply CO2 vapor or some other gas, (e.g. nitrogen gas), to the headspace of the LCO2 supply tanks. Using this method, it is also possible to provide the aforementioned boost in pressure.

As fracturing proceeds and LCO2 is drained from the storage vessels, the pressure of the LCO2 contained within the vessel will decrease, and the temperature will decrease if no headspace pressurizing method is used. This headspace pressurizing method ensures that the LCO2 supply pressure is maintained at a relatively fixed pressure of, for example, about 350 psia throughout the duration of the fracturing treatment. If this method is chosen, only a subcooling heat exchanger and either no booster pump or alternatively a very small booster pump is required to maintain the appropriate NPSH of the slurry over time as the LCO2 is drained from the LCO2 supply tanks. This method ensures and provides for the proper delivery of fracturing fluid with appropriate NPSH (sub-cooled slurry) to the high pressure frac pumps. In summary, the use of the headspace pressurizing method can help to decrease or eliminate the natural progression of pressure decreasing and temperature decreasing, as LCO2 is withdrawn from the supply tanks. This makes control of the system easier and/or helps to maintain an appropriate NPSH of the fracturing slurry supplied to the high pressure frac pumps.

In addition to the booster pump and sub-cooling heat exchanger approaches described above, other methods are useful to help achieve an appropriate proppant slurry with greater than the saturation pressure exerted upon the carbon dioxide to keep the system in an optimal liquid phase.

TABLE 1

Booster Pump and Sub-Cooling Combination Conditions and Data Obtained Using a 5 lb/gallon Proppant/Liquid Carbon Dioxide Fracturing Fluid for Optimizing Saturated Liquid Carbon Dioxide Well Injection

| | | 5 lb/gallon Fracturing Fluid | | | | | |
|---|---|---|---|---|---|---|---|
| LCO$_2$ tank conditions | | | | | | | |
| Sat pressure | psia | 125 | 150 | 200 | 250 | 300 | 350 |
| Sat temperature | F. | −46.4047 | −37.7138 | −23.1652 | −11.1187 | −0.74241 | 8.429268 |
| Sand conditions | | | | | | | |
| Inlet temp | F. | 80 | 80 | 80 | 80 | 80 | 80 |
| Moisture level | wt % | 1.0% | 1.0% | 1.0% | 1.0% | 1.0% | 1.0% |
| Moisture/sand cooling | btu/btu | 0.126 | 0.133 | 0.133 | 0.140 | 0.145 | 0.146 |
| Boost Pump | | | | | | | |
| Pressure rise | psi | 150 | 155 | 105 | 80 | 50 | 0 |
| Subcooler | | | | | | | |
| subcooling degrees | dF | 0 | 0 | −15 | −20 | −26 | −35 |
| Vaporized/Total CO2 | — | 0.000 | 0.000 | 0.056 | 0.076 | 0.099 | 0.130 |
| Vaporizer pressure | psia | 125 | 125 | 125 | 125 | 125 | 125 |
| Vaporizer temp | F. | −46.4 | −46.4 | −46.4 | −46.4 | −46.4 | −46.4 |
| Vaporizer min approach | dF | 0.9 | 9.7 | 9.0 | 15.9 | 20.1 | 19.8 |
| Subcooled feed temp | F. | −45.5 | −36.7 | −37.4 | −30.5 | −26.3 | −26.6 |
| Fracturing Fluid | | | | | | | |
| Fracturing Fluid Loading | lb/gal | 5 | 5 | 5 | 5 | 5 | 5 |
| Fracturing Fluid temp | F. | −23.2 | −15.8 | −15.7 | −10.1 | −6.0 | −5.7 |
| Fracturing Fluid press | psia | 275 | 305 | 305 | 330 | 350 | 350 |
| Fracturing Fluid sat. overpressure | psi | 75.1 | 75.3 | 75.2 | 75.3 | 75.9 | 74.8 |
| Fracturing Fluid subcooling | F. | 17.4 | 16.0 | 16.0 | 15.0 | 14.4 | 14.1 |

An alternative step to the embodiments regarding the invention as already presented includes: using pre-cooled proppant in pressurized proppant vessels by passing LCO2 or cold carbon dioxide vapor through the bed of proppant prior to full pressurization. This alternative method also allows for the utilization of cold nitrogen vapor in lieu of, or together with, carbon dioxide. In order to pre-cool the proppant and/or proppant mixture, indirect cooling of the proppant with a suitable refrigerant using heat transfer coils embedded in the pressure vessel and/or indirectly cooling the proppant during proppant loading by passing the proppant through a heat exchanger cooled by a suitable refrigerant is also viable. Cold carbon dioxide vapor can be obtained from "boil-off" from portable carbon dioxide storage units or from "flashed" carbon dioxide used to sub-cool the LCO2 stream. Included with these additional processes is the ability to apply increased pressure to the head space of the storage tanks as well as using booster pumps to properly maintain the stream of mixed proppant fracturing fluid. This methodology allows for the addition of more pressure to ensure greater than the saturation point is reached for carbon dioxide prior to entering the high pressure fracture pumpers.

An alternative method for sub-cooling the LCO2 in a heat exchanger is to flash the saturated high pressure LCO2 to a lower pressure, causing a portion of LCO2 to boil-off and the remaining portion to form a lower pressure saturated LCO2 stream. This can be achieved by throttling the high pressure saturated LCO2 across a valve or expansion device, and then passing the two-phase product through a phase separator to remove the vapor phase carbon dioxide from the resulting lower pressure saturated LCO2. It can also be achieved in the LCO2 storage vessels, by lowering the pressure in the headspace of the vessels, venting carbon dioxide vapor and creating a lower pressure saturated LCO2 in the storage vessels. When LCO2 is sub-cooled in such a manner, it is then pumped to a higher pressure by the booster pumps to create the desired pressure above saturation.

In addition, it is possible to use continuous addition of proppant to the proppant vessel when these vessels are in a pressurized state with the use of lock-hoppers, or other similar equipment, for introducing proppant to a pressurized system. To achieve the desired pressurization it is necessary to quickly refill the lock-hopper vessels with new proppant. This is normally achieved by rapidly conveying proppant using equipment such as inclined belt or other conveyer system including pneumatic conveyers, buckets, augers, etc. In achieving a continuous system, changing the proppant type as required by the geological formation at a specific point in time during the fracturing process, as determined by the frac design, can be required. Drying of proppant in the storage vessel to aid solids flow and prevent freezing may be required and can be achieved, for example, by flowing dry gas (could be carbon dioxide or nitrogen or any mixture of dry gases—including air—available at the well site) through the proppant bed. It is also possible to thicken (increase viscosity) or otherwise modify the rheological properties of the LCO2 stream to facilitate higher proppant loadings and transport of the proppant through downstream equipment, leading eventually into the well bore and the associated oil and gas formation.

Figure 3:
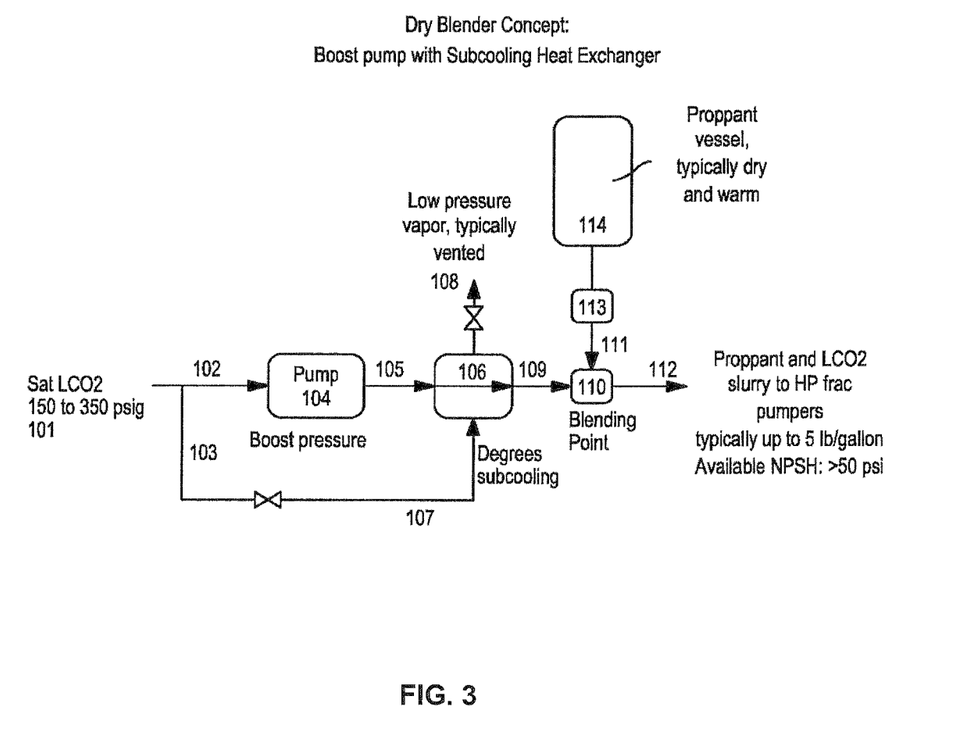
FIG. 3 is a schematic depiction of the dry blender concept to provide mixing, and injecting the mixture of dry proppant and LCO2 for fracturing a geological formation.

FIG. 3 is a high level process flow diagram showing the basic elements of the invention. Here, LCO2 is supplied from the site storage supply [101]. This LCO2 is typically saturated and supplied at a pressure of between about 150 and 350 psia. The majority of the feed LCO2 [102] is routed to one or more booster pumps [104] to raise the pressure above saturation and essentially generate sub-cooling in the LCO2 liquid stream [105]. The liquid stream [105] is further sub-cooled, in this instance, by physically cooling the stream via indirect heat exchange in the heat exchange unit [106] with a separate CO2 stream [107] that is provided at a lower pressure. A "slipstream" [103] of the original supply of LCO2 [101] is used for sub-cooling and the pressure of the slipstream is reduced to lower the boiling temperature of the stream [107]. As the main LCO2 stream [105] is cooled, generating the sub-cooled LCO2 stream [109], the low pressure CO2 stream [107] is vaporized and warmed, yielding stream [108], which is typically vented to atmosphere. The sub-cooled LCO2 stream [109] is then combined with the pressurized, metered proppant stream [111] at the blending point [110] to form a mixed LCO2 and proppant slurry, which becomes the fracturing fluid [112]. The metered, pressurized proppant stream [111] is dry and at a temperature that is typically much warmer than the sub-cooled LCO2 stream. Metering of the proppant stream supplied to the blending point [111] is accomplished using an appropriate metering device [113]. The proppant is supplied from the proppant storage vessel [114]. Depending on the type of metering device [113] selected (e.g. auger, eductor, valve, etc), the metering device [113] and blending point [110] could be provided for in a single unit. The amount of sub-cooling of the LCO2 stream [109] is managed such that the fracturing slurry stream [112] remains sub-cooled with about 50 psi of NPSH available after addition of the proppant stream [111]. The fracture fluid stream [112] is at least semi-continuously supplied to the high pressure frac pumpers which in turn supplies the well head with a further pressurized stream of dry proppant and CO2 fluid (i.e., fracturing fluid).

Figure 4:
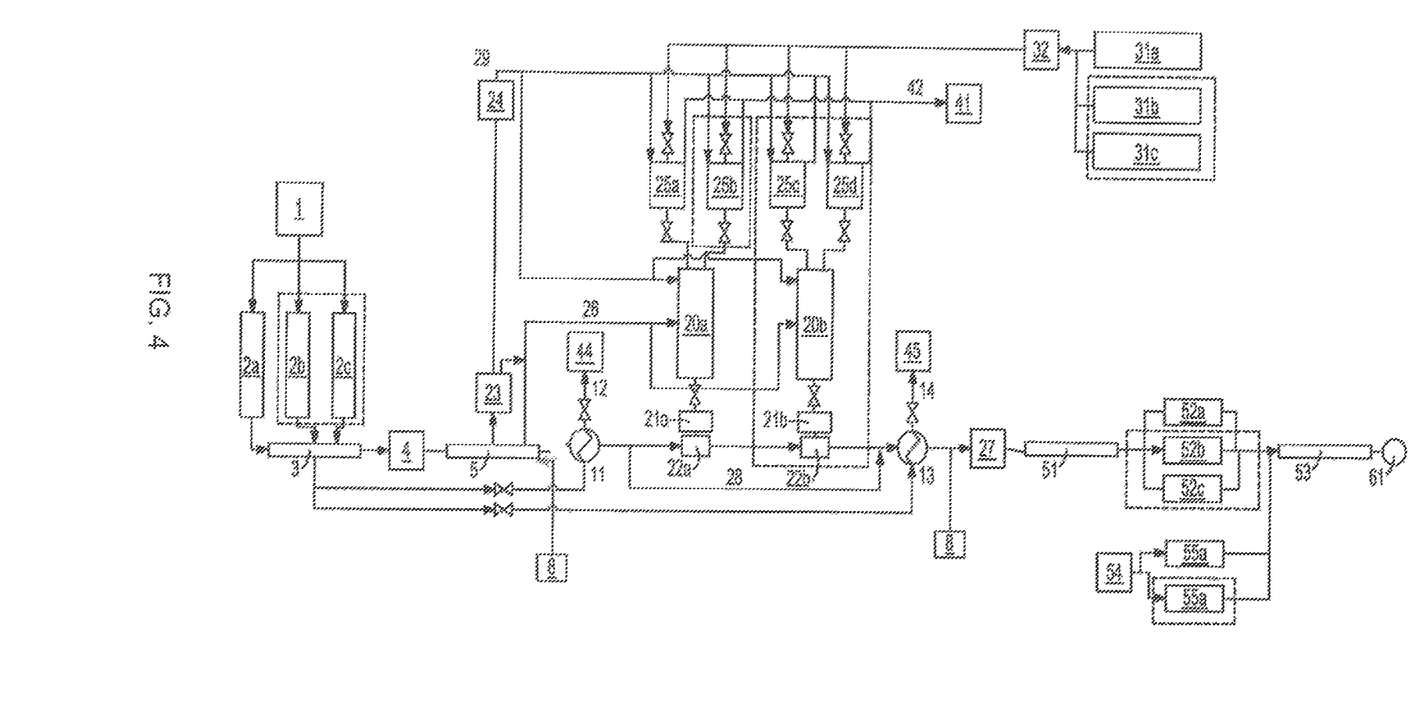
FIG. 4 is a schematic depiction of the overall system and method of the present invention for improving the semi-continuous or continuous supply of a mixture of dry proppant and LCO2 for fracturing of oil and gas formations.

FIG. 4 is a schematic detailing a complete process flow diagram that illustrates one embodiment of the systematic operation of the present invention. Specifically, an external source of gas pressure [1] is used to pressurize the head space of the liquid carbon dioxide (LCO2) storage vessels [2] creating a pressure that is above the saturation pressure of the LCO2 within the LCO2 tanks. The LCO2 then flows out of any one or more of numerous storage vessels [2a], [2b], and [2c] into a low pressure collection header [3]. The collection header [3] feeds one or more booster pumps [4] which may be arranged in a series and/or parallel arrangement depending on the flow or pressure required and the capacity and pressure capability of each pump. The high pressure feed carbon dioxide header [5] feeds the sub-cooling heat exchanger [11], pressurized gas supply vaporizer [23] and a fluid stream that is primarily a liquid stream [26], which can be used to cool and/or pressurize the now pressurized proppant storage vessel(s) [20a] and [20b].

The sub-cooling heat exchanger [11] cools high pressure feed LCO2. The pressure of the low pressure boiling carbon dioxide must be kept above a minimum of about 75 psia to ensure no solid carbon dioxide is formed (as at these pressures and temperatures, the carbon dioxide is close to its triple point). Typically, the boiling low temperature LCO2 stream will be kept at a pressure of about 125 psia. The stream of cold vapor carbon dioxide [12] is then vented to a stack arrangement, and/or sent to some other manifold for pressurization of another unit, and/or to cool and/or dry proppant.

Sub-cooled high pressure LCO2 then proceeds to the proppant mixing point [22a] and/or [22b] (which could be arranged in series or parallel), for mixing the sub-cooled LCO2 with proppant in the range of 0.1 to more than 10 lbs of proppant/gallon LCO2. The LCO2 booster pump [4] and sub-cooling heat exchanger [11] are operated in such a way as to keep the LCO2 and proppant slurry (proppant) sub-cooled at the proppant mixing points [22a] and [22b]. In one preferred embodiment, a pressure of at least 50 psi above the saturation pressure of carbon dioxide is maintained in the fracturing slurry after the proppant has been mixed with the LCO2. As pressure is correlated with temperature, this process results in a fracturing slurry temperature with at least a 50 psi "safety margin" before the fracturing slurry will begin to boil. Feeding of vapor or provision of a lower NPSH risks vapor lock or cavitation effects which negatively affect performance and can damage the pumps.

A parallel slipstream of pure LCO2 [28] can be provided that optionally bypasses at least one of the proppant mixing points, [22a] and [22b]. For example, this could be useful during the stages of the fracturing operation where no proppant is required (commonly referred to as pad or the padding stage). This bypass stream [28] can also be used to help control the final proppant loading, for example. In the case where the LCO2 and proppant fracturing fluid does not have enough sub-cooling, or when the proppant slurry is not sub-cooled and contains some vapor, an additional sub-cooling heat exchanger [13] and/or a slurry booster pump [27] is utilized to increase the pressure above the saturation pressure for carbon dioxide within the flowing fracturing fluid stream.

The fracturing slurry continues to be conveyed into the low pressure slurry manifold [51], and onward to the high pressure frac pumps, [52a], [52b], and [52c], that are arranged in parallel. Three such pumps are described here, however there may be any number used in order to meet the required capacity. The high pressure frac pumps [52a], [52b], [52c], feed the high pressure slurry manifold, [53] which in turn, feeds a wellhead [61]. Additives can be added at multiple locations depending on the purpose and type of chemical required for addition. These chemical additives often function to serve as viscosity control agents which can increase or decrease the viscosity of the fracturing fluid, as required during operation. As shown in FIG. 4, chemicals [8] can be added to the high pressure feed LCO2 manifold [5], and to the inlet of the slurry booster pump [27]. High pressure chemical addition also can occur by use of a holding tank [54], that is normally at ambient temperature and pressure. The tank contains these chemicals to allow for flow to a high pressure fracture pump [55a] disposed in parallel to the slurry frac pumps, [52a], [52b], and [52c], before mixing with the fracturing slurry in the high pressure slurry manifold [53]. Dry proppant is supplied from the proppant delivery transports or from portable proppant storage units, [31a], [31b], and [31c], to a proppant transport system [32] which moves the proppant vertically and/or horizontally to ensure proppant delivery to the top of the lock-hoppers [25a], [25b], [25c], and [25d] and/or to the top of the pressurized proppant storage vessels [20a], [20b]. In the embodiment shown, the proppant is delivered to the top of the lock-hoppers [25a], [25b], [25c] and, [25d]. One or more of the lock-hoppers [25a], [25b], [25c], and [25d] are employed to pre-pressurize or further pressurize the proppant storage vessel [20a], [20b]. More than one pressurized proppant storage vessel(s) can be used to enable the delivery of multiple proppant types during a fracture treatment during which proppant delivery is continuous or at least semi-continuous.

During operation, proppant is delivered to the lock-hopper [25] and the lock-hopper proppant feed valves are closed. The lock-hopper unit is pressurized via the CO2 stream flowing within the pressure line [29] and the pressure control system [24]. When the pressure is sufficiently close to the pressure of the pressurized proppant storage vessel [20] the bottom lock-hopper valve is opened and the lock-hopper contents are transferred to the pressurized proppant storage vessel, [20]. The lock-hoppers [25] are also used to pressurize and deliver proppant when the pressurized proppant storage vessel [20] is not delivering proppant. Alternatively, the lock-hoppers [25] can be used while proppant is being metered out of the pressurized proppant and storage vessel [20] in order to better utilize the equipment and to reduce cycle and proppant filling time. One mode of continuous operation allows for the pressurized proppant storage vessel [20a] or [20b] to deliver proppant to the metering devices [21a] or [21b], with a lock hopper [25a] adding pressurized proppant to a proppant storage vessel [20a] while lock hopper [25b] is being refilled with proppant and repressurized. When lockhopper [25a] is empty, it is 'blown down' of pressure, refilled with proppant and repressurized while lockhopper [25b] is adding pressurized proppant to the storage vessel [20a]. Additionally, depending on the size of the hoppers [25] compared to the size of the proppant storage vessel(s) [20], and the frequency with which each can be filled and emptied, there may be any number of lockhoppers employed.

Proppant is metered from the pressurized proppant storage vessel [20] through the metering device [21a] and [21b]. The metering device consists of a variable speed auger, a control valve, an eductor, or some combination thereof. The metering device [21] delivers a proppant into the sub-cooled LCO2 stream to form the fracturing slurry and provides operation even if upset conditions allow some LCO2 to get back into the pressurized proppant storage vessel [20] or in case the pressurized proppant storage vessel [20] is intentionally operated with both proppant and LCO2. The pressure level in the pressurized proppant storage vessel(s) [20a] and [20b] is controlled by a pressure control device [24], which can be as simple as a valve for pressure regulation. The metered dry proppant is combined with the flowing LCO2 at mixing points [22a] and [22b]. In the case of an eductor, the metering devices [21] and mixing points [22] are essentially combined because the flow of solids is determined by the volume of liquid flowing through the eductor. It is critical to be able to control and closely maintain the pressure of the system. Gaseous carbon dioxide will flow with the dry proppant into the sub-cooled LCO2 stream, since it will fill the void space between proppant particles. The positive pressure differential between the proppant storage vessel and sub-cooled LCO2 stream will cause additional gaseous carbon dioxide to flow through the proppant particles. As the gaseous carbon dioxide flows into the sub-cooled LCO2 stream, the liquid and gas will mix and cause the gaseous carbon dioxide to condense into liquid form.

In some installations, it might be necessary to pre-cool or dry the proppant in the pressurized proppant storage vessels [20] by the addition of cold vapor and/or LCO2. This pre-cooling or drying can be achieved using stream [26] or by using the cold vapor from the sub-cooling heat exchanger [12] and/or [14]. The flow of gas or liquid used for this purpose can be introduced to the top, bottom and/or middle sections of the pressurized proppant storage vessel [20]. This cooling of the proppant (typically sand), can also take place as the sand is being used, for example with LCO2 in stream [26] can be administered to the bottom of the proppant storage vessel [20] as the sand is being withdrawn from the vessel. In this way the withdrawn sand is being partially cooled before it is mixed with the main stream of LCO2 to reduce the size of the subcooling heat exchanger [11]. The vapor that is created can be used to pressurize the proppant storage vessel [20] and also to reduce the size of the vaporizer [23] that is required to maintain pressure in the proppant supply vessel [20].

Any vent gas or blow-down from the pressurized proppant vessel [20], or from the lock-hoppers [25] is collected in a common vent manifold [42], subsequently vented and/or otherwise utilized for additional operations, such as recycle, as necessary. Operation [41] will most likely consist of a vent stack but this gaseous or vapor based carbon dioxide stream can also be used for other purposes. For example, the vented carbon dioxide can be used for further drying of proppant, or for pressurizing the carbon dioxide system that can in turn be used to pressurize the liquid carbon dioxide supply vessels, etc. Furthermore, in the case of a smaller fracturing process that can be completed with one batch of the proppant/proppant mixture (nominally 80 tons or less), there is no need for the addition of proppant to the pressurized proppant vessel (not shown) and the use of lock-hoppers (not shown).

Figure 5:
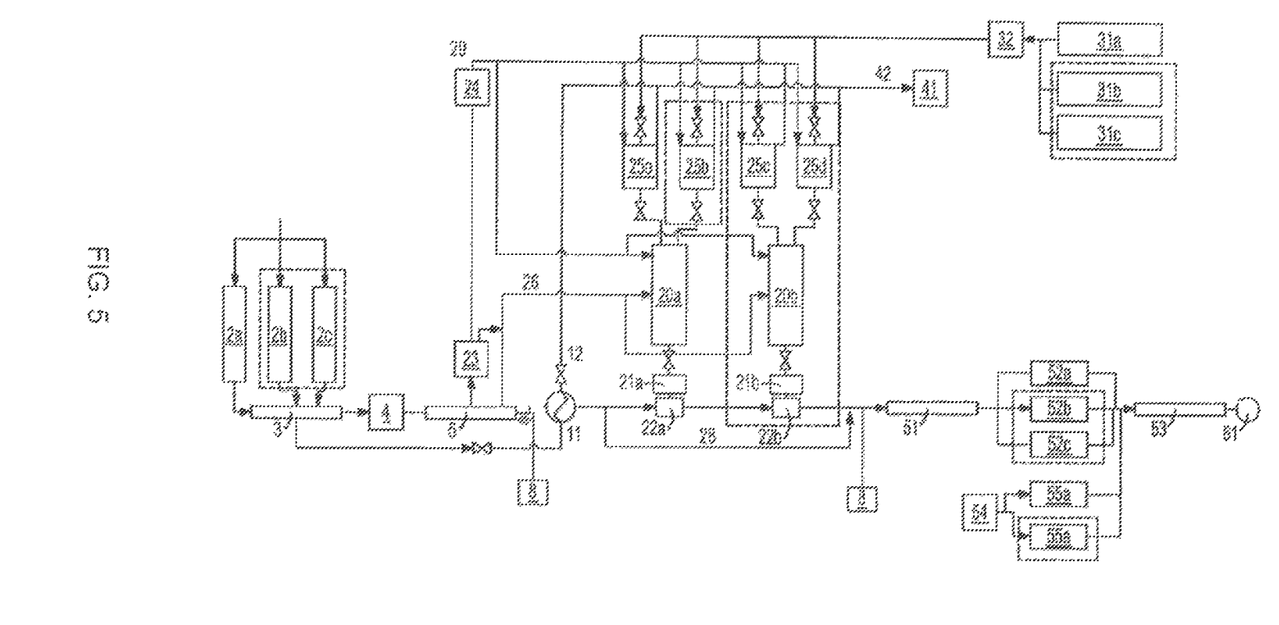
FIG. 5 is a further illustration of certain aspects of the process flow diagram shown in FIG. 4 without the provision of further sub-cooling after the slurry mixing point.

FIG. 5 indicates that for some fracturing installations, it might be necessary to pre-cool the dry proppant in the pressurized proppant storage vessels [20] with the addition of cold vapor and/or LCO2. This pre-cooling or drying can be achieved using the fluid stream [26] or by using the cold vapor from the sub-cooling heat exchanger [12] and/or [14]. The flow used for this purpose can be introduced to the top, bottom, and/or middle sections of the pressurized proppant storage vessel [20]. Any vent gas or blow-down from the pressurized proppant vessel [20], or from the lock-hoppers [25] is collected in a common vent manifold [42], subsequently vented, or otherwise utilized in the overall operation [41]. Furthermore, in the case of a smaller fracturing operation that can be completed with 80 tons or less of the proppant/proppant mixture, there is no need for the addition of proppant to the pressurized proppant vessel and the use of the lock-hoppers.

While the invention herein disclosed has been described by means of specific embodiments and processes or control techniques associated therewith, numerous modifications and variations can be made thereto by those skilled in the art without departing from the scope of the invention as set forth in the claims or sacrificing all of its features and advantages. Various modifications and changes may be made with respect to the foregoing detailed description. Certain embodiments of the invention as will become apparent to those skilled in the art without departing from the spirit of the present disclosure.

The invention claimed is:

1. A system for making a fracturing fluid comprising a mixture of dry proppant and liquid carbon dioxide ($LCO_2$) for use in a fracturing operation, comprising:
    loading dry proppant into at least one dry proppant storage vessel with one or more conveying means;
    pressurizing said proppant storage vessel(s) to between 75 and 600 psia with a gas, thereby pressurizing said proppant storage vessel(s) and ensuring said proppant remains dry;
    supplying a stream of sub-cooled pure $LCO_2$ having a pressure approximately equal to the pressurized proppant storage vessel(s); and
    adding dry proppant from the pressurized proppant storage vessel(s) to the stream of sub-cooled pure $LCO_2$, thereby forming a mixed $LCO_2$ and proppant fracturing fluid, wherein the temperature of the dry proppant is greater than the temperature of the $LCO_2$ and wherein the $LCO_2$ remains in liquid form.

2. The system of claim 1, wherein dry proppant is fed into said proppant storage vessel from at least one lock hopper, allowing for loading of fresh dry proppant into said proppant storage vessel before the first charge of dry proppant has been emptied.

3. The system of claim 1, further comprising raising the pressure of said fracturing fluid in at least one high pressure pump prior to supplying to an injection well to carry out the fracturing operation.

4. The system of claim 1, further providing a control system for controlling the flow of dry proppant from pressurized proppant storage vessel(s) by allowing the flow of said dry proppant through a metering device into said sub-cooled $LCO_2$ stream; and
    adding said proppant to said sub-cooled $LCO_2$ stream to obtain a desired level of proppant loading within said sub-cooled $LCO_2$ that is in the range of 0.1 to 10 lbs of dry proppant to each gallon of sub-cooled $LCO_2$ thereby forming said fracturing fluid.

5. The system of claim 1, wherein said fracturing fluid is provided on a continuous basis for fracturing during well injection.

6. The system of claim 1, wherein chemical additives are added to said fracturing fluid such that these additives act as viscosity control agents of said fracturing fluid.

7. A system for making a fracturing fluid comprising a mixture of dry proppant and liquid carbon dioxide ($LCO_2$) for use in a fracturing operation, comprising:
    supplying dry proppant that is pressurized to between 75 and 600 psia with a gas;
    providing a stream of sub-cooled pure $LCO_2$ having a pressure approximately equal to the pressurized dry proppant; and
    adding dry pressurized proppant to the stream of sub-cooled pure $LCO_2$, thereby forming a mixed $LCO_2$ and proppant fracturing fluid, wherein the temperature of the dry proppant is greater than the temperature of the $LCO_2$ and wherein the $LCO_2$ remains in liquid form.

* * * * *